(12) United States Patent
Han et al.

(10) Patent No.: US 12,724,663 B2
(45) Date of Patent: Sep. 1, 2026

(54) APPARATUS AND METHOD FOR RESETTING INFORMATION ABOUT THE EXECUTION OF APPLICATION SOFTWARE PROVIDED IN A MULTI-CORE PROCESSOR-BASED AVIONICS COMPUTER DEVICE

(71) Applicant: AGENCY FOR DEFENSE DEVELOPMENT, Daejeon (KR)

(72) Inventors: Jong Pyo Han, Daejeon (KR); Bong Gyu Kim, Daejeon (KR); Seo Hee Yang, Daejeon (KR); Yong Jin Kwon, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 18/955,172

(22) Filed: Nov. 21, 2024

(65) Prior Publication Data

US 2025/0165338 A1 May 22, 2025

(30) Foreign Application Priority Data

Nov. 21, 2023 (KR) ........................ 10-2023-0162735

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01)

(58) Field of Classification Search
CPC ............. G06F 11/0793; G06F 11/0721; G06F 11/1441; G06F 11/3031; G06F 11/302; G06F 11/3006; G06F 11/3034
See application file for complete search history.

(56) References Cited

U.S. PATENT DOCUMENTS 10,088,843 B1 * 10/2018 Radack ................ G05D 1/0055
2005/0246568 A1 * 11/2005 Davies ................ H04L 67/1097 714/2

FOREIGN PATENT DOCUMENTS

JP 2008-084080 A 4/2008
KR 10-0279204 B1 1/2001
(Continued)

OTHER PUBLICATIONS

SnakeCHTW et al., Event ID 1001—Microsoft Community, Mar. 23, 2018, https://answers.microsoft.com/, 4 pages (Year: 2018).*

*Primary Examiner* — Katherine Lin
(74) *Attorney, Agent, or Firm* — MILES & STOCKBRIDGE P.C.

(57) ABSTRACT

Provided are systems, devices, methods, and instructions for resetting information about execution of application software provided in a multi-core processor-based avionics computer device, including a computation board provided with a plurality of pieces of application software, configured to generate state information including information about a fault in application software or hardware, and based on a multi-core processor in which the plurality of pieces of application software are distributed for each core and operated and a system control board configured to determine a fault in application software or hardware of the computation board based on the state information received from the computation board and to reset information about execution of application software based on information about a fault in application software or hardware of the computation board.

8 Claims, 11 Drawing Sheets

(56) References Cited

FOREIGN PATENT DOCUMENTS

| | | | |
|---|---|---|---|
| KR | 10-0990386 | B1 | 11/2010 |
| KR | 10-1025979 | B1 | 3/2011 |
| KR | 10-1418488 | B1 | 7/2014 |
| KR | 10-1581309 | B1 | 12/2015 |
| KR | 2022-0115972 | A | 8/2022 |
| KR | 10-2577755 | B1 | 9/2023 |
| WO | 2021/133346 | A1 | 7/2021 |

* cited by examiner

APPARATUS AND METHOD FOR RESETTING INFORMATION ABOUT THE EXECUTION OF APPLICATION SOFTWARE PROVIDED IN A MULTI-CORE PROCESSOR-BASED AVIONICS COMPUTER DEVICE

PRIORITY INFORMATION

This application claims the benefit of the Korean Patent Application No. 10-2023-0162735, filed on Nov. 21, 2023, in the Korean Intellectual Property Office, the disclosure of which is incorporated herein by reference in its entirety.

FIELD OF THE INVENTION

The example embodiments of the present invention generally relate to systems, devices, methods, and instructions for resetting information about the execution of application software provided in a multi-core processor-based avionics computer device.

DISCUSSION OF THE RELATED ART

The integrated modular avionics system is a system design manner for reducing the weight of an aircraft and decreasing the influence of redesign according to performance improvements or discontinued parts and is applied to many aircraft systems that are recently developed. An avionics computer having a plurality of computation boards and a data converting device for converting numerous legacy inputs and outputs into a high-speed system bus to provide to the avionics computer are the most significant components in the components of the integrated modular avionics system. In the avionics computer, a plurality of software modules for processing subsystem functions of an aircraft are distributed to and provided in the plurality of computation boards.

To enhance the operational reliability of the integrated modular avionics system, in case of a fault in hardware or software in a computation board during an aviation operation, a reconfiguration technology is applied for operating a function being operated in the computation board in another spare board. However, the existing avionics computer reconfiguration technology adopts a manner of previously designating and allocating a spare module to replace the fault-occurring computation board, which may lead to a limited reduction in the weight of an aircraft since spare computation boards are required by the number of computation boards to be reconfigured. In addition, when a fault occurs in a single software operating in a computation board, all software functions operating normally in the computation board may also be displaced to another computation board.

SUMMARY OF THE INVENTION

Accordingly, the present invention is directed to systems, devices, methods, and instructions for resetting information about the execution of application software provided in a multi-core processor-based avionics computer device that substantially obviate one or more problems due to limitations and disadvantages of the related art.

An aspect provides an apparatus and a method for resetting information about the execution of application software provided in a multi-core processor-based avionics computer device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an aspect, there is provided an apparatus for resetting information about execution of application software provided in a multi-core processor-based avionics computer device, the apparatus including a computation board provided with a plurality of pieces of application software, configured to generate state information including information about a fault in application software or hardware, and based on a multi-core processor in which the plurality of pieces of application software are distributed for each core and operated and a system control board configured to determine a fault in application software or hardware of the computation board based on the state information received from the computation board and to reset information about execution of application software based on information about a fault in application software or hardware of the computation board.

The system control board may be configured to determine a type and a level of a fault based on the state information received from the computation board and to reset the information about execution of application software based on the type and the level of the fault.

The system control board may be configured to determine a type and a level of a fault to be divided into when a minor fault or a major fault occurs for a unit of application software and when a minor fault or a major fault occurs for a unit of computation board hardware based on the state information received from the computation board.

The system control board may be configured to restart fault-occurring application software when a minor fault occurs for the unit of application software.

The system control board may be configured to operate application software in another computation board provided with application software identical to fault-occurring application software when a major fault occurs for the unit of application software.

The system control board may be configured to operate application software in another computation board provided with every application software operated in a fault-occurring computation board when a major fault occurs for the unit of computation board hardware.

According to another aspect, there is provided a method of resetting information about execution of application software provided in a multi-core processor-based avionics computer device, the method including obtaining state information including information about a fault in application software or hardware from a computation board provided with a plurality of pieces of application software and based on a multi-core processor in which the plurality of pieces of application software are distributed for each core and operated, determining a fault in application software or hardware of the computation board based on the state information received from the computation board, and resetting information about execution of application software based on information about a fault in application software or hardware of the computation board.

The determining of the fault may include determining a type and a level of a fault based on the state information received from the computation board.

The determining of the fault may include determining a type and a level of a fault to be divided into when a minor fault or a major fault occurs for a unit of application software and when a minor fault or a major fault occurs for a unit of computation board hardware based on the state information received from the computation board.

The resetting of the information about the execution of application software may include restarting fault-occurring application software when a minor fault occurs for the unit of application software.

The resetting of the information about the execution of application software may include operating application software in another computation board provided with application software identical to fault-occurring application software when a major fault occurs for the unit of application software.

The resetting of the information about the execution of application software may include operating application software in another computation board provided with every application software operated in a fault-occurring computation board when a major fault occurs for the unit of computation board hardware.

According to another aspect, there is provided a computer program stored in a recording medium for executing the method using a computer.

According to example embodiments, it is possible to perform reconfiguration for each level of faults occurring in an avionics computer with an integrated modular avionics structure in which a plurality of computation boards are equipped with a plurality of pieces of application software.

It is to be understood that both the foregoing general description and the following detailed description are examples and explanatory and are intended to provide explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
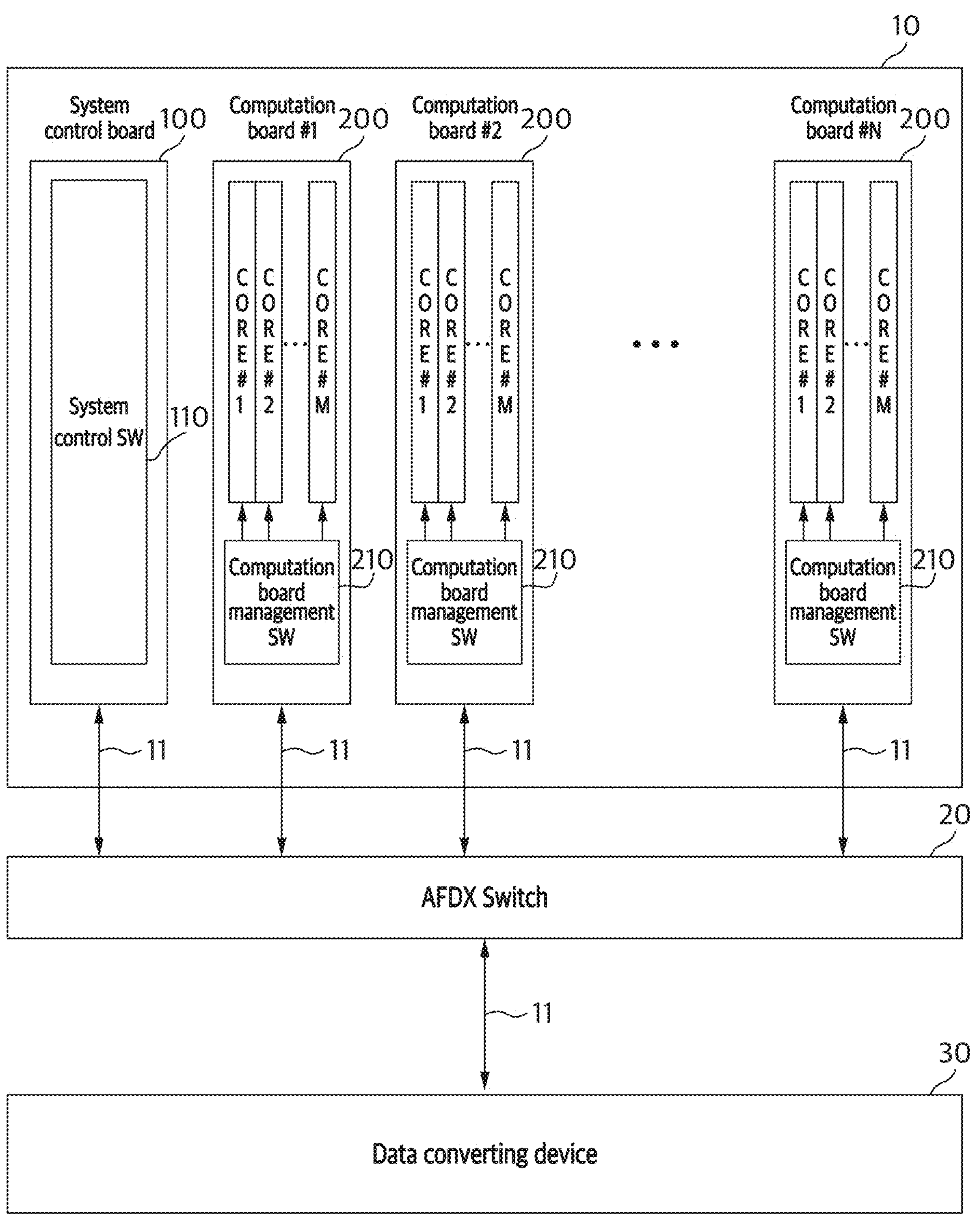
FIG. 1 is a diagram for illustrating a configuration and an operation of an apparatus for resetting information about the execution of application software according to an example embodiment of the present invention.

Reference will now be made in detail to the embodiments of the present invention, examples of which are illustrated in the accompanying drawings. Hereinafter, example embodiments of the present invention will be described in detail with reference to the accompanying drawings. When described with reference to the drawings, the same or corresponding elements are assigned the same reference numerals, and duplicate descriptions thereof are omitted.

In the example embodiments below, such terms as first and second are used not as limited meanings but to distinguish one element from another. In addition, singular expressions include plural expressions unless contextually otherwise defined. Further, terms, such as comprise, include, and have, indicate the presence of a feature or an element described in the specification and do not exclude the possibility of the addition of one or more other features or elements.

In the drawings, elements may be exaggerated or reduced in size for convenience of description. For example, since the size and thickness of each element shown in the drawings are arbitrarily represented for convenience of description, the present invention is not limited to the illustrations in the drawings.

In the example embodiments below, when a portion of an area, a component, a part, a block, or a module is described as being above or on another portion, the portion may be directly on another portion or another area, component, part, block, or module may be interposed in between. In addition, when areas, components, parts, blocks, or modules are described as being connected, the areas, components, parts, blocks, or modules may be directly connected or may be indirectly connected as another area, component, part, block, or module is interposed between the areas, components, parts, blocks, or modules.

Hereinafter, various example embodiments of the present invention will be described in detail with reference to the accompanying drawings so that those of ordinary skill in the art may easily implement the invention.

FIG. 1 is a diagram for illustrating a configuration and an operation of an apparatus for resetting information about the execution of application software according to an example embodiment of the present invention.

Referring to FIG. 1, illustrated is an overall block diagram of a system of a multi-core processor-based avionics computer that is reconfigurable for each fault level. The multi-core processor-based avionics computer that is reconfigurable for each fault level may consist of an avionics computer 10 having a single system control board 100 and a plurality of computation boards 200, a data converting device 30 for converting multiple analog/discrete and low-speed serial communication into avionics full-duplex switched Ethernet (AFDX) communication 11 which is high-speed serial communication to provide to the avionics computer 10, and an AFDX switch 20 for providing interlocking paths of the AFDX communication 11 between the avionics computer 10 and the data converting device 30 and between boards inside the avionics computer 10.

Referring to FIG. 1, the apparatus for resetting information about the execution of application software according to an example embodiment of the present invention may include the system control board 100 and the computation board 200. Here, the system control board 100 and the computation board 200 may be provided in the avionics computer 10.

The computation board 200 may be a board based on a multi-core processor in which a plurality of pieces of application software are distributed for each core and operated. In addition, the computation board 200 may be equipped with a computation board management software 210.

The computation board 200 may be a board provided with a plurality of pieces of application software, configured to generate state information including information about a fault in application software or hardware, and based on a multi-core processor in which a plurality of pieces of application software are distributed for each core and operated.

The computation board management software 210 may manage a state of application software provided in the computation board 200 and change a scheduler of application software or perform restarting according to an instruction received from the system control board 100.

The system control board 100 may manage the avionics computer 10 using state information received from the plurality of computation boards 200 provided in the avionics computer 10. In addition, the system control board 100 may be equipped with system control software 110.

The system control board 100 may determine a fault in application software or hardware of the computation board 200 based on the state information received from the computation board 200 and reset information about the execution of application software based on information about a fault in application software or hardware of the computation board 200.

The system control software 110 may determine a type and a level of a fault occurring in the computation board 200 and establish a response measure to generate a measure for responding to the corresponding fault.

The system control board 100 according to an example embodiment of the present invention may determine a type and a level of a fault based on the state information received from the computation board 200 and reset information about the execution of application software based on the type and the level of the fault.

The system control board 100 according to an example embodiment of the present invention may determine a type and a level of a fault to be divided into when a minor fault or a major fault occurs for a unit of application software and when a minor fault or a major fault occurs for a unit of computation board 200 hardware based on the state information received from the computation board 200.

The system control board 100 according to an example embodiment of the present invention may restart fault-occurring application software when a minor fault occurs for the unit of application software.

The system control board 100 according to an example embodiment of the present invention may operate application software in another computation board 200 provided with application software identical to fault-occurring application software when a major fault occurs for the unit of application software.

The system control board 100 according to an example embodiment of the present invention may operate application software in another computation board 200 provided with every application software operated in a fault-occurring computation board 200 when a major fault occurs for the unit of computation board 200 hardware.

The apparatus for resetting information about the execution of application software according to an example embodiment of the present invention may further include the AFDX switch 20 and the data converting device 30.

The AFDX switch 20 may provide paths for transmitting and receiving data between the avionics computer 10 and the data converting device 30 and between the system control board 100 and the plurality of computation boards 200 within the avionics computer.

The data converting device 30 may convert a plurality of analog and discrete signals and low-speed serial communication data into high-speed AFDX communication to provide to the avionics computer 10.

The system control board 100 may perform a role of determining and executing a response measure depending on a level of a fault occurring in the avionics computer 10 using state information received from the plurality of computation boards 200. The response measure includes restarting or reconfiguration of fault-occurring software. The system control board 100 may be equipped with the system control software 110 which performs the role.

The system control board 100 may perform interlocking with all computation boards 200 provided in the avionics computer 10 through AFDX communication via the AFDX switch 20. The computation board 200 may be equipped with a multi-core processor, and every application software may be previously provided in flash memory. The computation board management software 210 provided in the computation board 200 may control whether to execute and whether to restart in each core of the application software provided in the flash memory and transfer state information received from each application software to the system control software 110.

A plurality of pieces of application software operated in the avionics computer 10 may be distributed to each computation board 200 and executed. In other words, each computation board 200 is equally equipped with all pieces of application software to operate in the avionics computer 10, and according to an instruction of scheduler setting for each computation board 200 of the system control board 100, the computation board 200 to execute each application software may be determined. Therefore, each application software may be executed in one computation board 200 alone.

Figure 2:
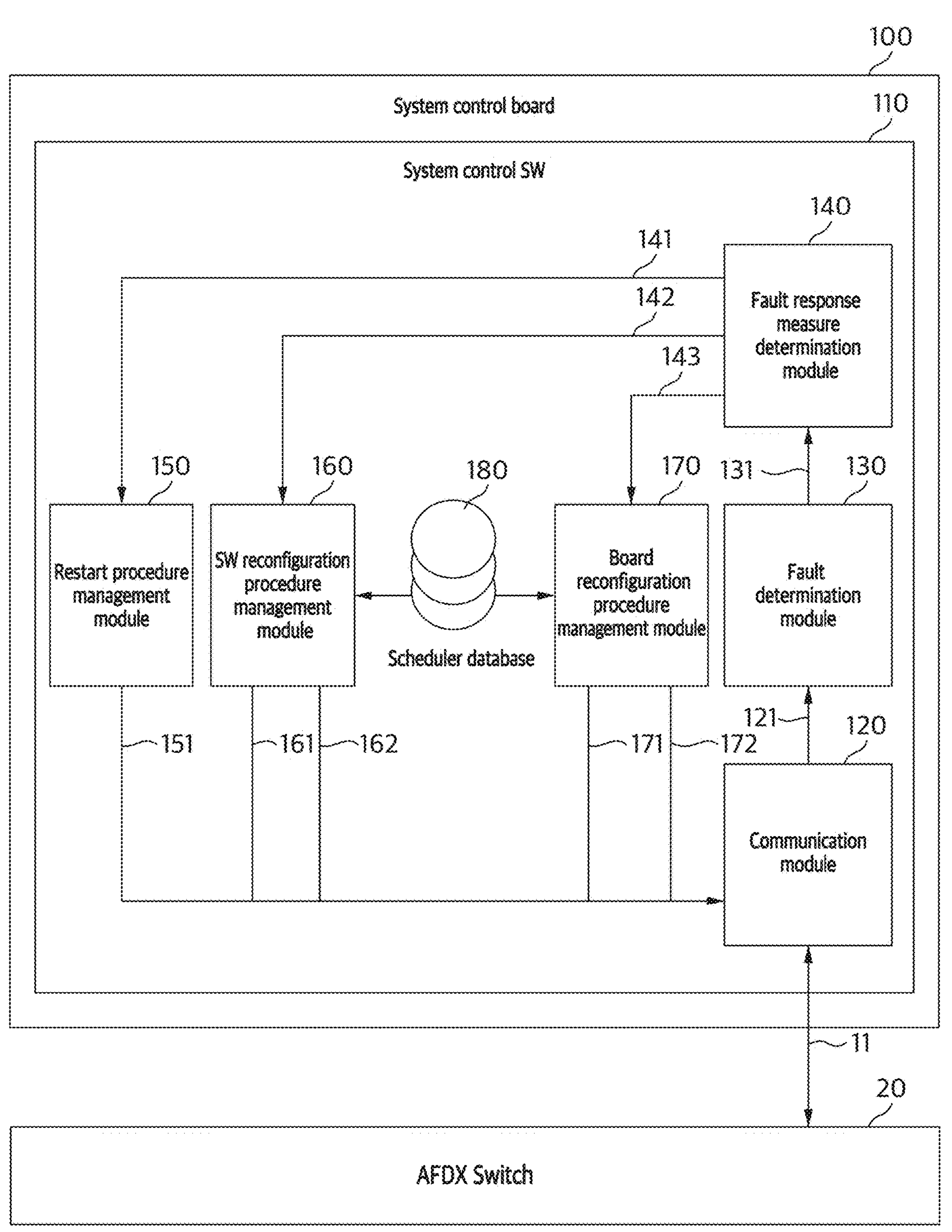
FIG. 2 is a diagram illustrating one example of a structure of a system control board according to an example embodiment of the present invention.

FIG. 2 is a diagram illustrating one example of a structure of a system control board according to an example embodiment of the present invention.

Referring to FIG. 2, a detailed block diagram of the system control board 100 according to an example embodiment of the present invention is illustrated. The system control board 100 may be equipped with the system control software 110. A communication module 120 of the system control software 110 may interlock with the computation board 200 and the data converting device 30 through the AFDX communication 11.

A fault determination module 130 may determine whether a fault occurs in each computation board 200 and the type and level of a fault by analyzing computation board state information 121 received from each computation board 200 through the communication module 120. For example, a fault type may be divided into a fault in software or a fault in computation board hardware.

When a fault occurs in hardware of the computation board 200 at a level that a function requested from a system is not performable may be determined as a major fault in computation board 200 hardware, and when damage or decreased performance occurs in some functions of hardware but a requested function is performable normally may be determined as a minor fault in computation board 200 hardware. Similarly, for each application software allocated for each core of each computation board 200 and operated, a major fault or a minor fault in application software may be determined based on whether a function is performable in the corresponding application software.

A fault response measure determination module 140 may determine a response measure for resolving a fault after receiving a fault determination result 131 as in above from the fault determination module 130. The fault response measure determination module 140 may transmit a restart measure instruction 141 to a restart procedure management module 150 when a minor fault occurs in application software.

When a major fault occurs in application software, the fault response measure determination module 140 may transmit a software reconfiguration measure instruction 142 to stop operating the corresponding application software in the computation board 200 operating the corresponding application software and operate the corresponding application software in another computation board to a software reconfiguration procedure management module 160.

When a major fault occurs in computation board 200 hardware, the fault response measure determination module 140 may transmit a board reconfiguration measure instruction 143 to displace and operate application software operated in the corresponding computation board 200 to another computation board 200 which may operate normally to a board reconfiguration procedure management module 170.

The fault response measure determination module 140 may not take a follow-up measure because of no influence on a system function when a minor fault occurs in computation board 200 hardware.

The restart procedure management module 150 may transmit a restart instruction 151 for application software in which a minor fault occurs to the communication module 120. For example, the communication module 120 may transmit the restart instruction to the target computation board 200.

The software reconfiguration procedure management module 160 may identify software scheduler information for not operating fault-occurring software in the computation board 200 operating the fault-occurring software from a scheduler database 180 and transmit an instruction 161 to stop operating software where a major fault occurs including the information to the communication module 120. For example, the communication module 120 may transmit the instruction to the fault-occurring computation board 200.

The software reconfiguration procedure management module 160 may select the computation board 200 to newly operate the software and identify software scheduler information for operating the software in the corresponding computation board 200 from the scheduler database 180. The software reconfiguration procedure management module 160 may transmit an instruction 162 for newly operating software including the information, and the communication module 120 may transmit the instruction to the target computation board 200.

The board reconfiguration procedure management module 170 may transmit an instruction 171 for stopping computation board operation to the communication module 120 in order to stop operating the corresponding board where a major fault occurs in hardware in the communication module 120. For example, the communication module 120 may transmit the instruction to the fault-occurring computation board 200.

The board reconfiguration procedure management module 170 may select the computation board 200 which may additionally operate every software being operated in the corresponding computation board and identify software scheduler information on the computation board 200 which may additionally operate the every software from the scheduler database 180. The board reconfiguration procedure management module 170 may transmit an instruction 172 for newly operating software including the information to the communication module 120, and the communication module 120 may transmit the instruction to the target computation board 200.

Figure 3:
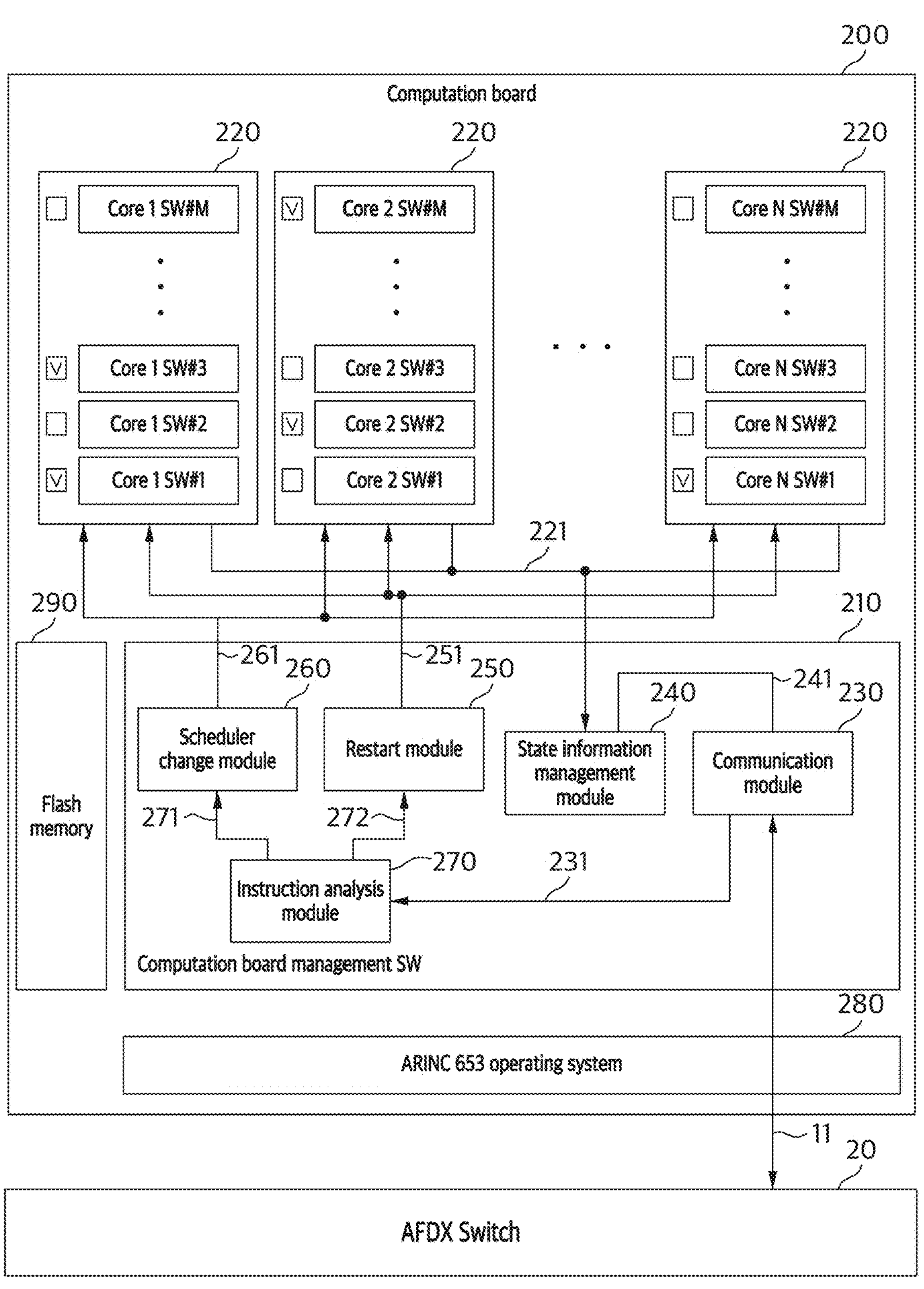
FIG. 3 is a diagram illustrating one example of a structure of a computation board according to an example embodiment of the present invention.

FIG. 3 is a diagram illustrating one example of a structure of a computation board according to an example embodiment of the present invention.

Referring to FIG. 3, a detailed block diagram of the computation board 200 according to an example embodiment of the present invention is illustrated. The computation board 200 may be equipped with a multi-core processor. Every application software provided in the avionics computer 10 may be provided in flash memory 290 of every computation board 200, and a core to be executed for each application software may be previously allocated.

The computation board management software 210 may determine whether to execute each application software according to an instruction of the system control board 100. Each application software executed in each core 220 may transmit state information 221 for each application software to a state information management module 240, and the state information management module may aggregate the state information 241 for a unit of computation board to transfer a communication module 230 of the computation board 200. In addition, the communication module 230 may transmit the information through the AFDX communication 11 via the AFDX switch 20 to the system control board 100. For example, each computation board 200 may be equipped with an ARINC 653 operating system 280, and accordingly, functions of time partitioning and spatial partitioning of application software may be provided. Further, the ARINC 653 operating system 280 may provide a service of controlling whether to execute application software through a restart and a scheduler change of each application software.

The communication module 230 may transfer a system control instruction 231 received through the AFDX communication 11 from the system control board 100 to an instruction analysis module 270. The instruction analysis module 270 may determine the type and validity of an instruction transferred from the system control board 100 and, when the instruction is determined as a scheduler change instruction, transmit a scheduler change instruction 271 to a scheduler change module 260 and, when the instruction is determined as a software restart instruction, transmit a software restart instruction 272 to a restart module 250.

The scheduler change module 260 may change 261 a scheduler of a specific core 220 according to an instruction of the system control board 100 to change whether to execute each application software by utilizing the service of the ARINC 653 operating system 280. As software not operating but waiting is newly operated or software being operated is not operated depending on an instruction of the scheduler change module 260, an operation form of the corresponding computation board 200 may be changed.

The restart module 250 may restart specific application software within a specific core 220 according to an instruction of the system control board 100 by utilizing the service of the ARINC 653 operating system 280. A restart, newly operating, or operation stop state of each application software may be transmitted through the state information 221 for each application software to the state information management module 240.

Figure 4A:
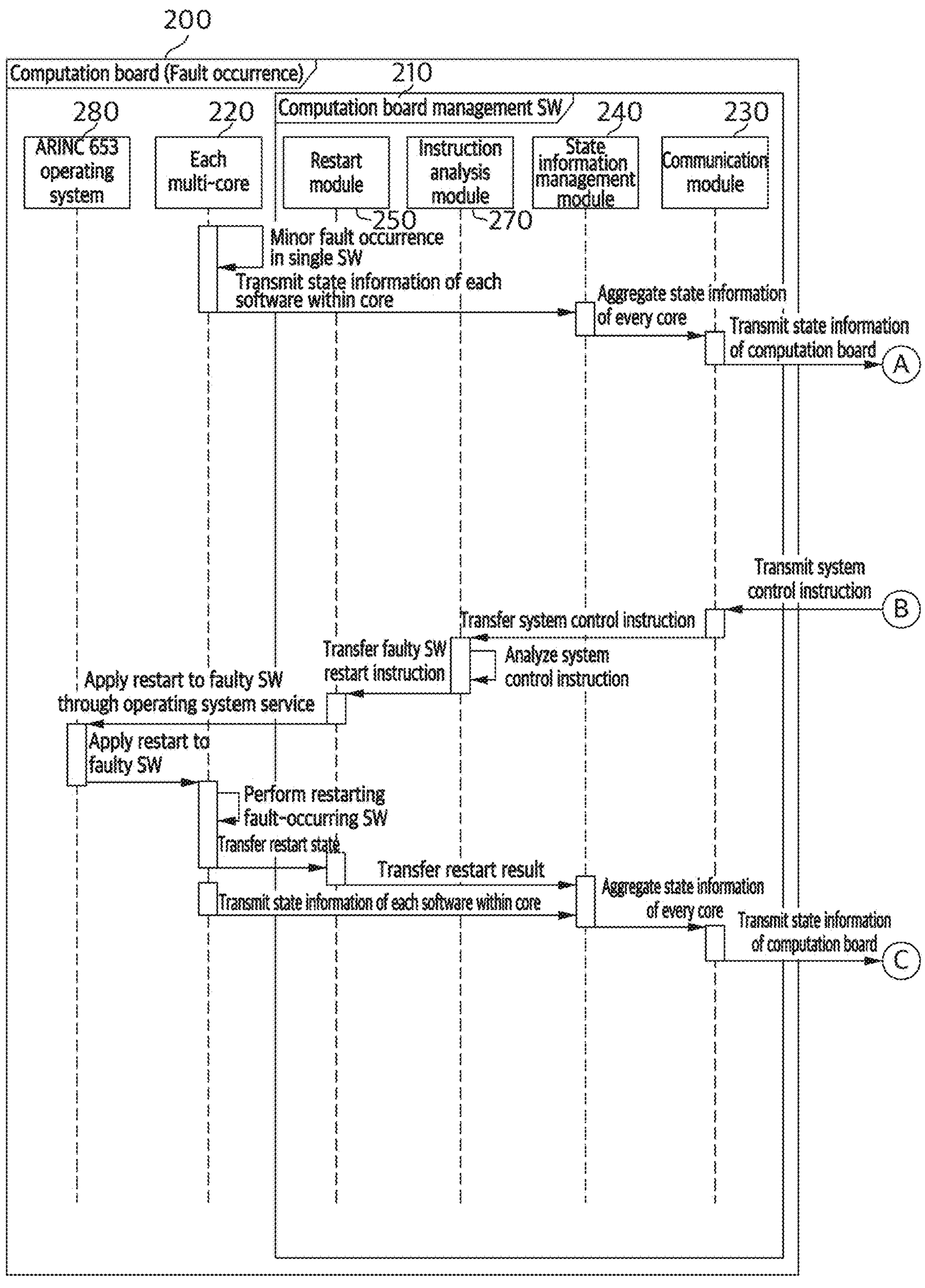
FIGS. 4 to 6 are flowcharts for illustrating a method of resetting information about the execution of application software according to an example embodiment of the present invention.
Figure 4B:
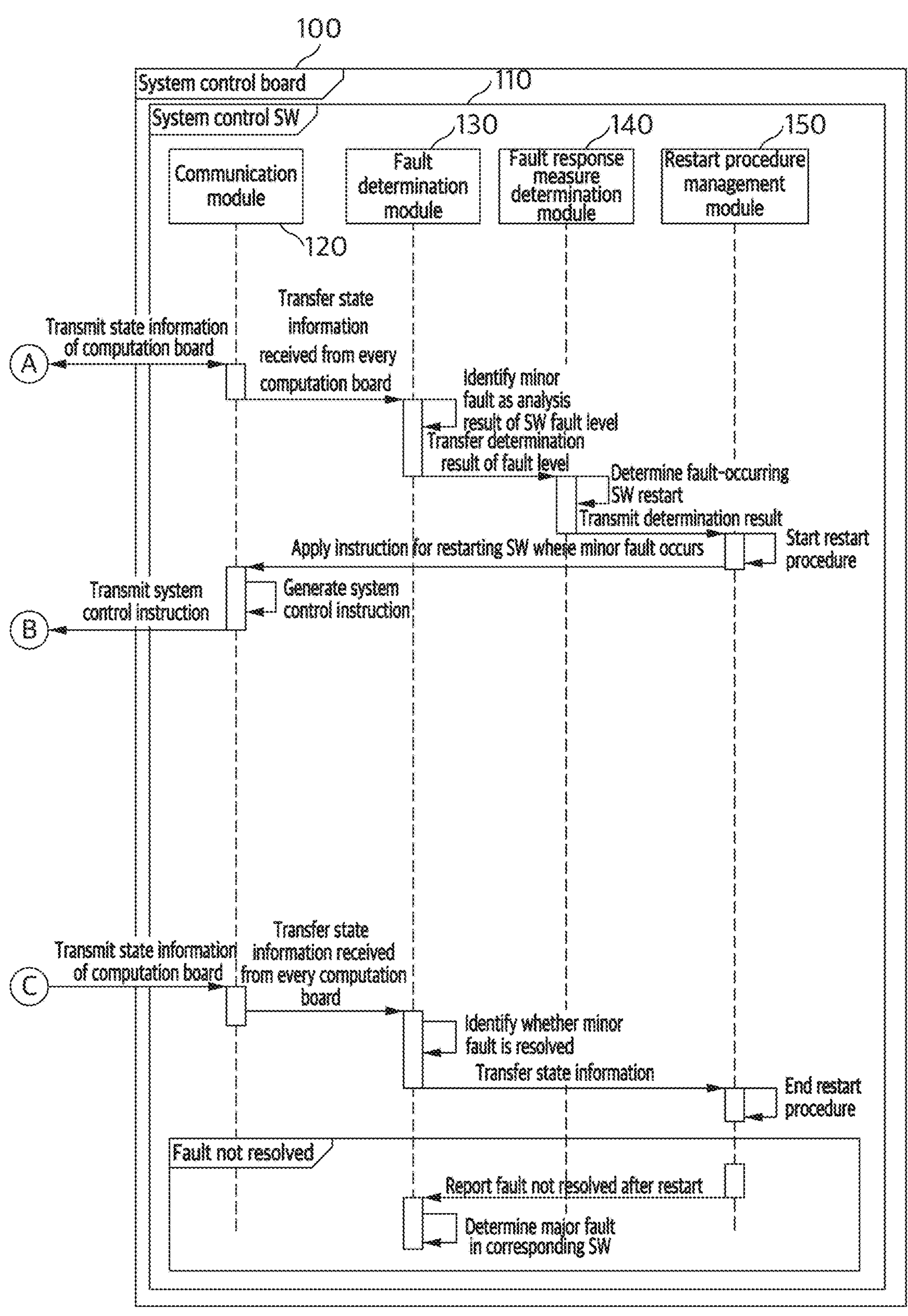
Figure 5A:
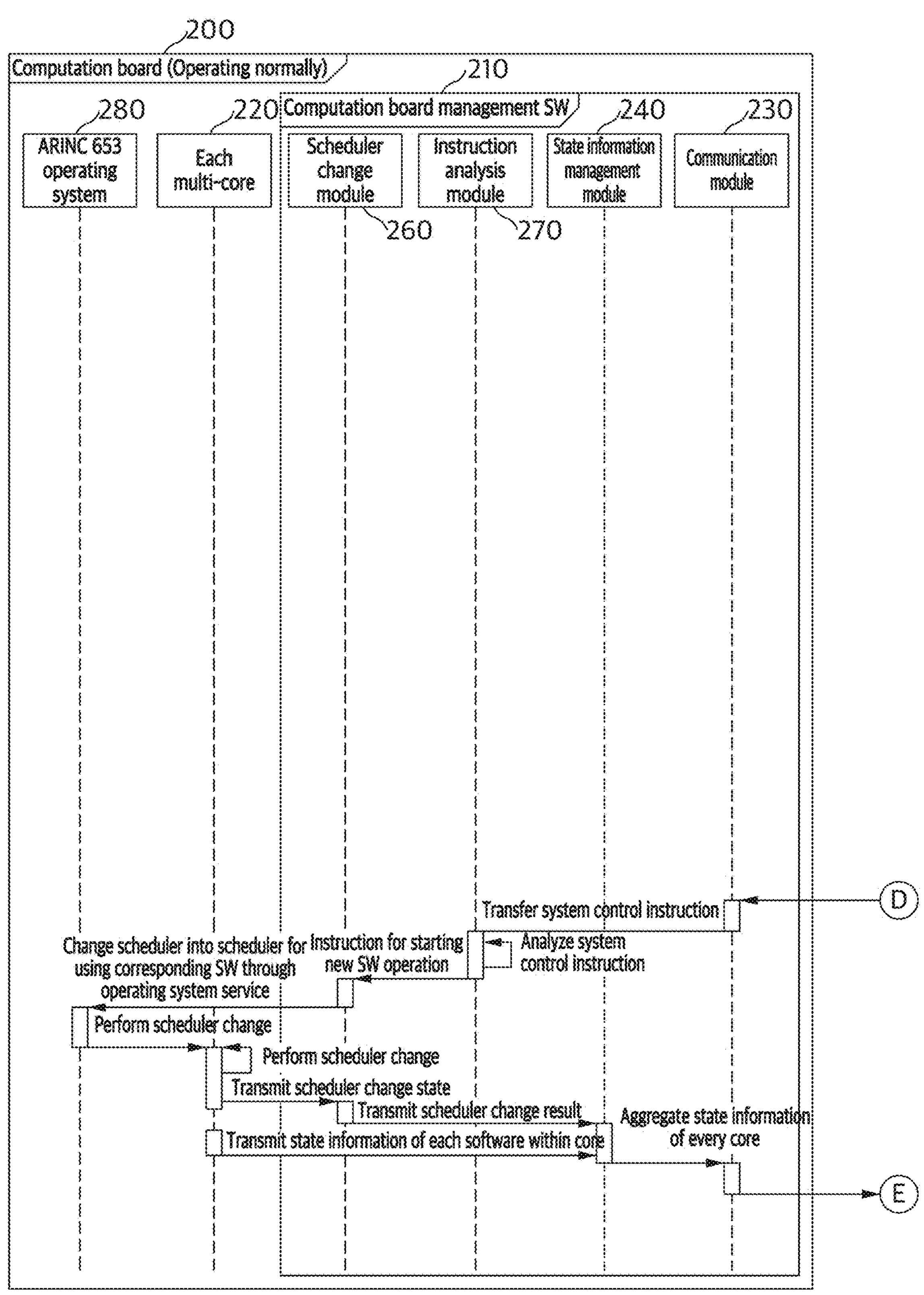
Figure 5B:
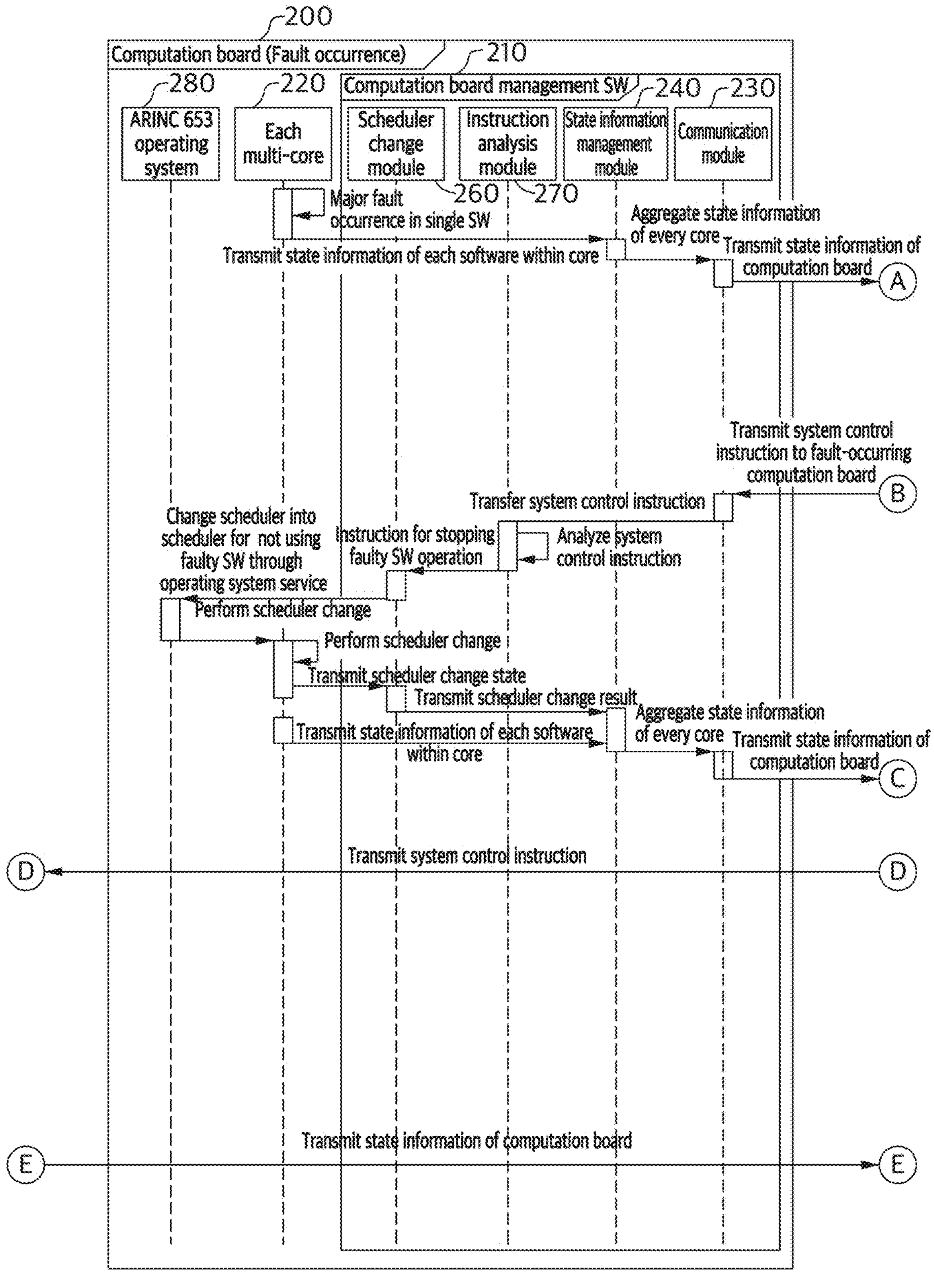
Figure 5C:
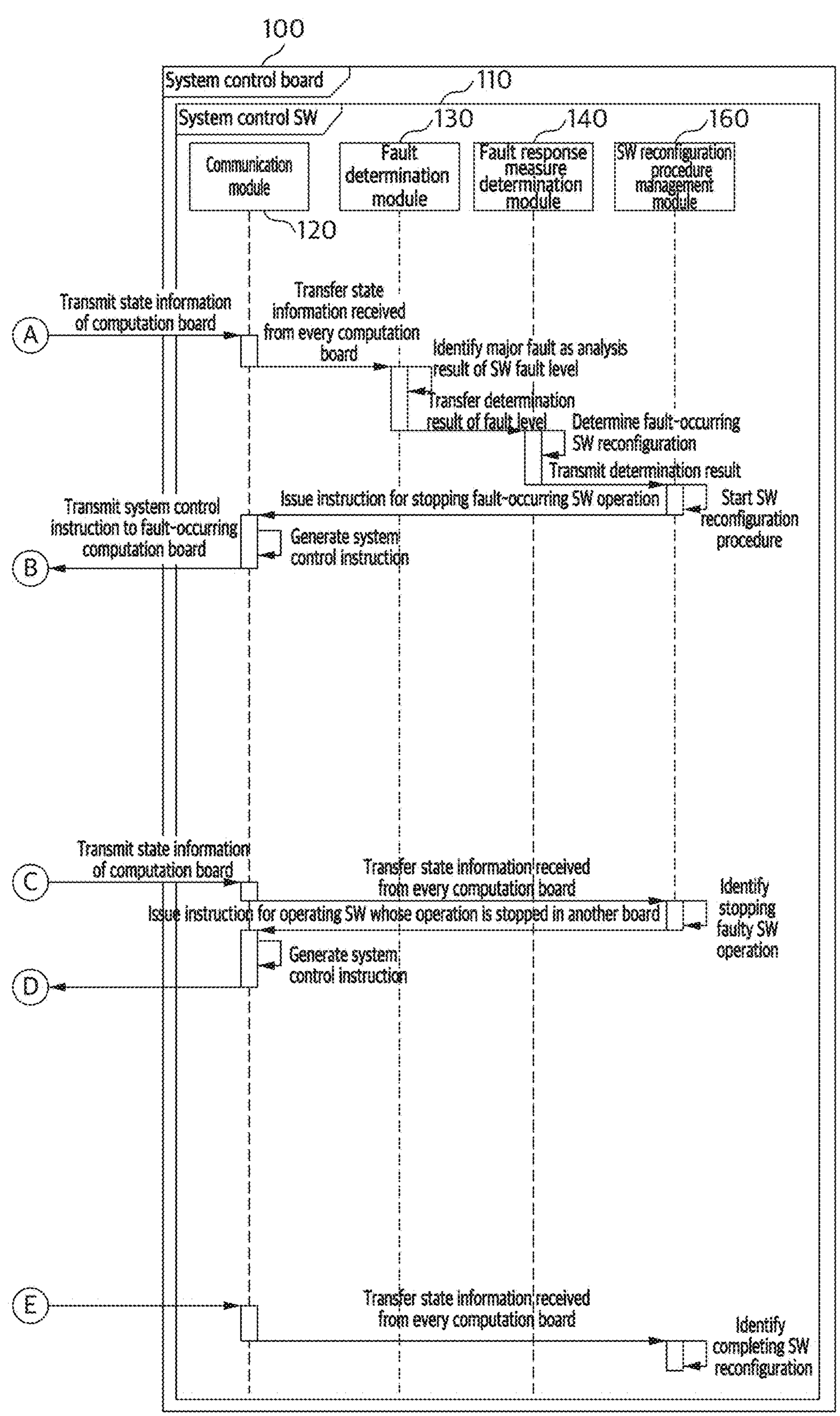
Figure 6A:
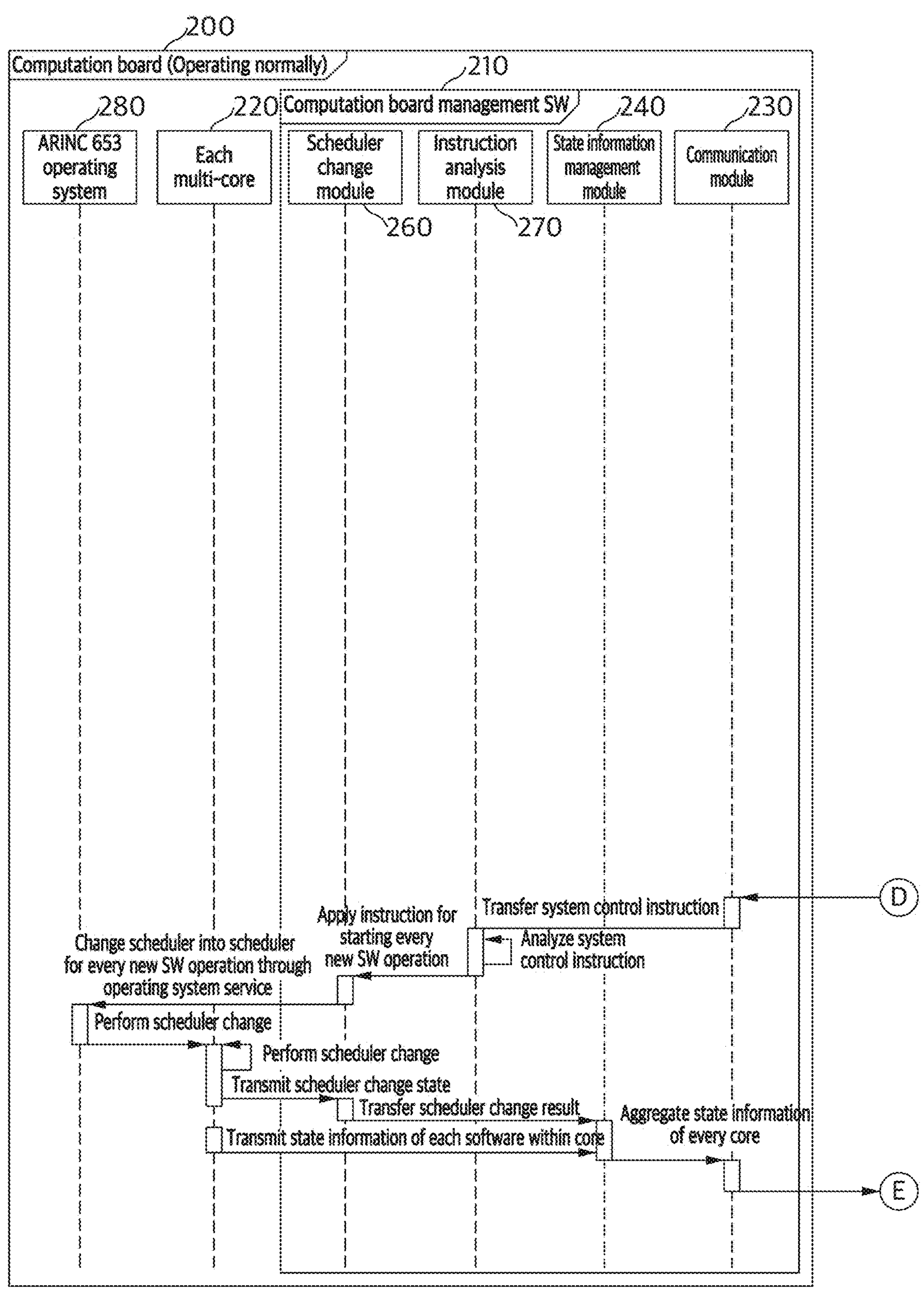
Figure 6B:
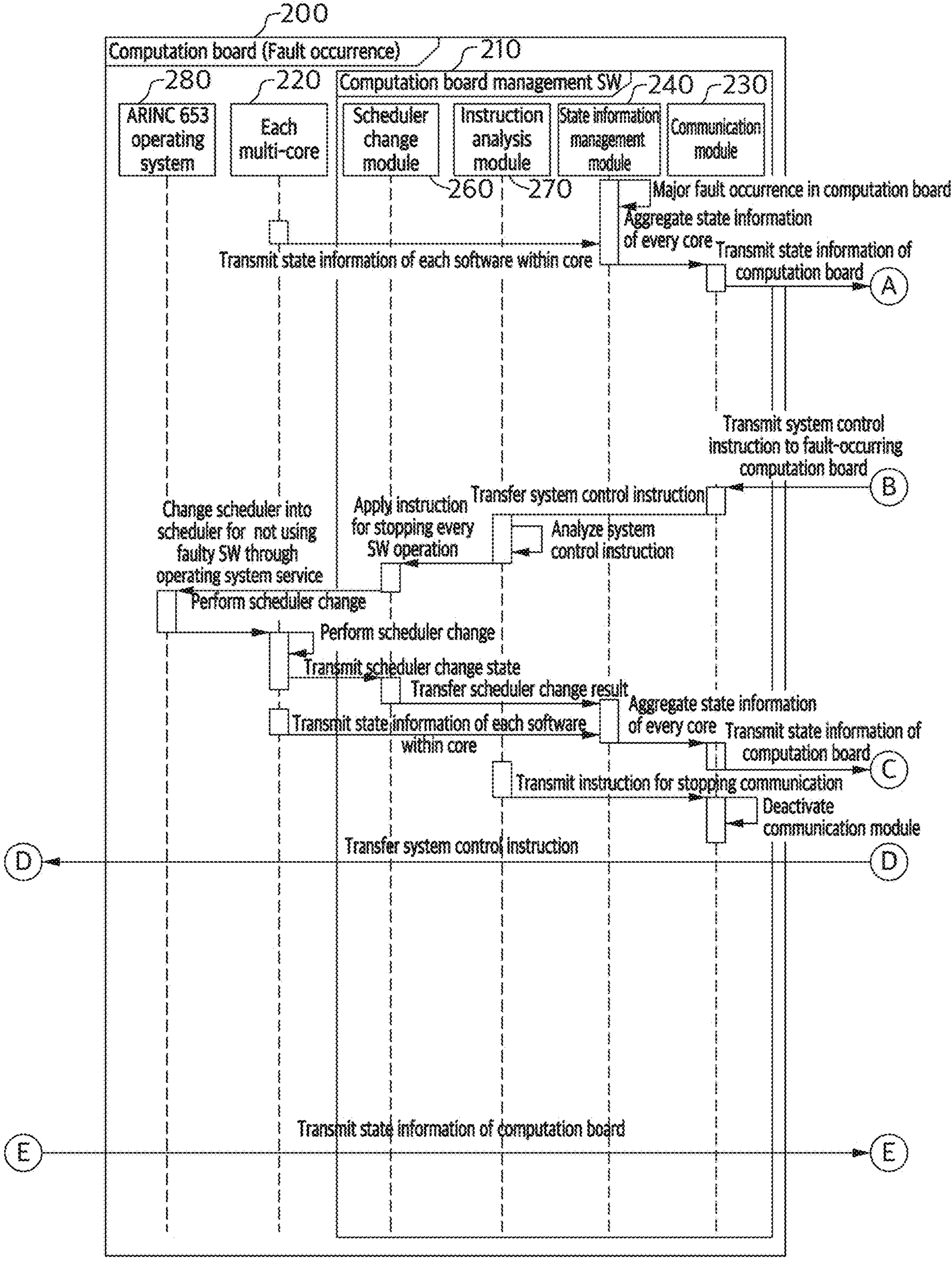
Figure 6C:
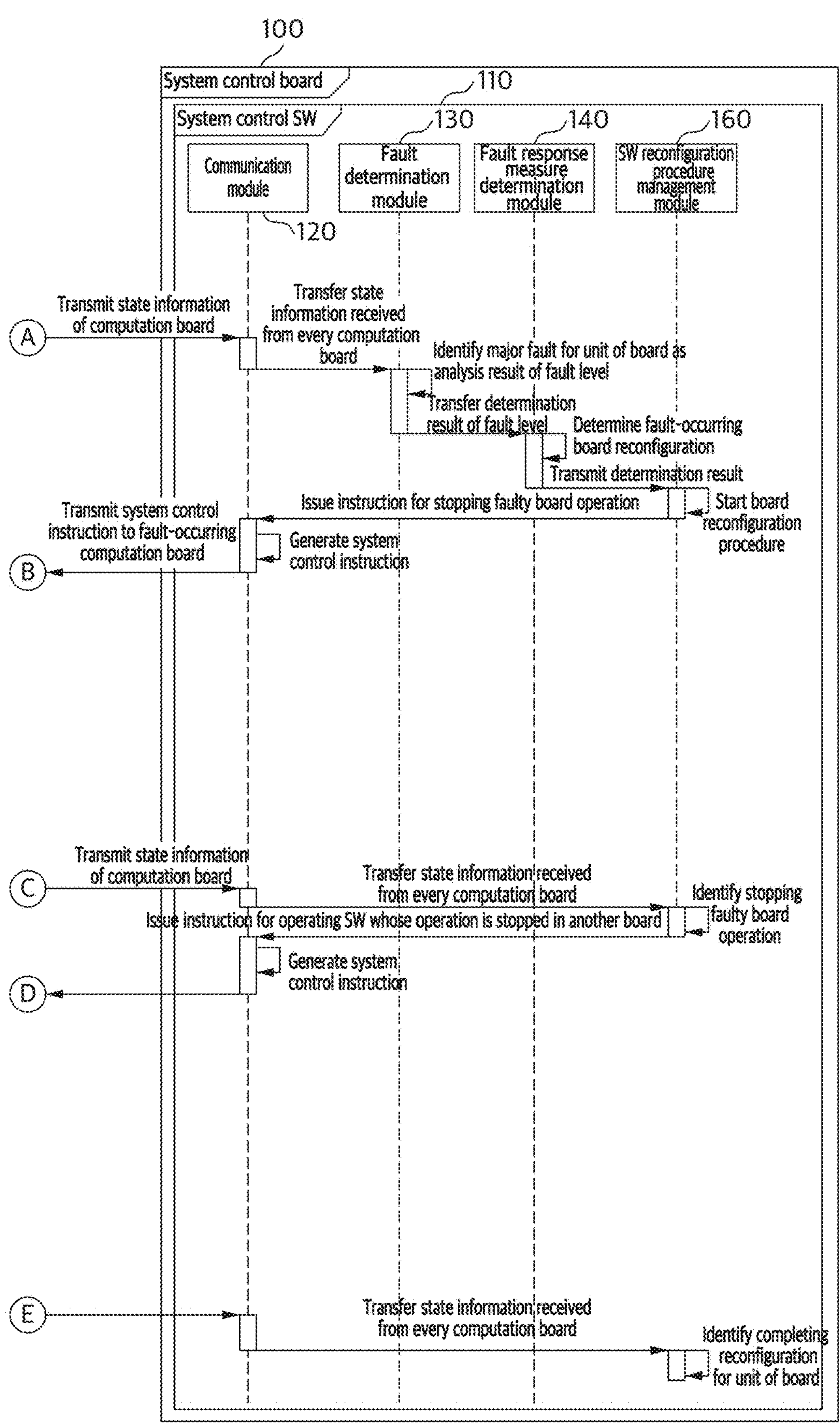

FIGS. 4 to 6 are flowcharts for illustrating a method of resetting information about the execution of application software according to an example embodiment of the present invention.

Firstly, referring to FIG. 4, a flowchart is illustrated when a minor fault occurs in software operating in a computation board according to an example embodiment of the present invention.

When a minor fault occurs in application software operating in the core 220 of the computation board 200, relevant contents are set for the state information 221 of the application software. The state information management module 240 collects the state information 221 of every application software operating in each core 220 and then aggregates the state information 221 into the state information 241 for a unit of computation board and transmits the state information 241 to the communication module 230. The communication module 230 transmits computation board state information generated from the aggregated information to the system control software 110 of the system control board 100.

The communication module 120 of the system control software 110 aggregates information received from every computation board 200 and transfers the information to the fault determination module 130. The fault determination module 130 analyzes fault information for each application software within the information and determines that a minor fault occurs in specific application software operating in the core 220 of a specific computation board 200.

The fault determination module 130 transmits a result of determining an identification number of fault-occurring application software and a fault level to the fault response measure determination module 140.

The fault response measure determination module 140 determines a response measure depending on the type and level of a fault, and restarting is performed for a minor fault in application software, software reconfiguration for a major fault in application software, and board reconfiguration for a major fault in a computation board. Therefore, as the fault response measure determination module 140 determines that application software where a minor fault occurs is to be restart and transmits a determination result to the restart procedure management module 150.

The restart procedure management module 150 is a software module for issuing an instruction for starting a restart and identifying whether the restart ends. The restart procedure management module 150 transmits information for transmitting a restart instruction for software in which a minor fault occurs to the corresponding computation board 200 to the communication module 120, and the communication module 120 aggregates computation board 200 control instructions received from each software module and generates a system control instruction to transmit to the corresponding computation board 200.

The communication module 230 of the computation board 200 transmits the received system control instruction to the instruction analysis module 270. The instruction analysis module 270 analyzes the system control instruction and transfers a restart or scheduler change instruction. Since a minor fault occurs in application software and a restart instruction is received from the system control software 110, the instruction analysis module 270 transfers the restart instruction for the application software in which the minor fault occurs to the restart module 250.

The restart module 250 applies restarting to the specific application software in which the minor fault occurs operating within a specific core 220 using a service of the ARINC 653 operating system. The corresponding application software transfers a restart progressing state during restarting and a restart completed state to the restart module 250, and the restart module 250 transfers the completion of restarting the corresponding software to the state information management module 240. The state information management module 240 transmits state information of application software within each core, including a restart state, through the communication module 230 to the system control board 100.

The fault determination module 130 of the system control board 100 analyzes the state information of the application software and transfers a result of identifying whether restarting the corresponding software is completed and whether the minor fault occurring before restarting is resolved to the restart procedure management module 150. The restart procedure management module 150 ends a restart procedure when restarting is completed and a minor fault is resolved, and when a minor fault is not resolved, reports the occurrence of a major fault in the corresponding software to the fault determination module 130 so that reconfiguration for a unit of application software may be performed.

Referring to FIG. 5, a flowchart is illustrated when a major fault occurs in software operating in a computation board according to an example embodiment of the present invention.

Similarly to a minor fault occurring in application software, when a major fault occurs in application software, relevant contents are set for the state information 221 of the corresponding application software. The fault determination module 130 of the system control software 110 analyzes state information received from every computation board 200 and identifies that a major fault occurs in specific application software operating in a specific core 220 within a specific computation board 200. When it is received from the restart procedure management module 150 that a fault is not resolved after restarting even though the corresponding fault is a minor fault, the fault determination module 130 determines the fault as a major fault.

The fault response measure determination module 140, when a major fault occurs in application software, transmits the software reconfiguration measure instruction 142 to the software reconfiguration procedure management module 160. The software reconfiguration procedure management module 160 transmits the instruction 171 for stopping computation board operation to the communication module 120 in order to stop operating the corresponding application software running on the computation board 200, where a major fault occurs in the application software. The instruction analysis module 270 of the corresponding computation board analyzes a system control instruction to identify the instruction and transmits the scheduler change instruction 271 to the scheduler change module 260 in order to stop operating the corresponding application software.

The scheduler change module 260 performs a change into a scheduler to stop operating the application software where the major fault occurs using a service of the ARINC 653 operating system. The scheduler change module 260 identifies a result of the scheduler change and transfers the completion of the scheduler change to the state information management module 240.

The state information management module 240 transmits state information of application software within each core including a result of a scheduler change through the communication module 230 to the system control board 100. The software reconfiguration procedure management module 160 identifies that operating the application software where the major fault occurs is stopped through state information received from the computation board 200, and then transmits the instruction 162 for newly operating software to another computation board 200 operating normally in order to newly operate the application software. Since the corresponding computation board 200 is previously equipped with, but not executing, the corresponding application software, a change into a scheduler for operating the corresponding application software is performed after the instruction is transferred. A procedure related thereto is identical to a procedure regarding a computation board operating application software where a major fault occurs. The software reconfiguration procedure management module 160 identifies that the corresponding application software is executed in the computation board 200 and then ends a reconfiguration procedure for a unit of software.

Referring to FIG. 6, a flowchart is illustrated when a major fault occurs in hardware in the computation board 200 according to an example embodiment of the present invention.

The state information management module 240, when a fault occurs in computation board hardware, applies relevant contents to the state information 221. The fault determination module 130 analyzes state information received from every computation board 200 and identifies that a major fault occurs in hardware of a specific computation board 200.

The fault response measure determination module 140, when a major fault occurs in hardware of the computation board 200, transmits the instruction 171 for stopping computation board operation via the communication module 120 to the computation board 200 where the major fault occurs in order to stop operating the corresponding board. The instruction analysis module 270 of the corresponding computation board analyzes a system control instruction to identify the instruction and transmits the scheduler change instruction 271 to the scheduler change module 260 in order to change a scheduler into a scheduler for stopping operating every application software being operated.

The instruction analysis module 270, when changing the scheduler is completed, transmits the corresponding information to the system control board 100 and then transmits a communication stop instruction to the communication module 230. The communication module 230 excludes the corresponding computation board 200 from the avionics computer by deactivating the communication module of the corresponding computation board 200. The board reconfiguration procedure management module 170 having the information received through computation board state information transmits a list of pieces of application software being operated in the computation board 200 where the major fault occurs together with the instruction 172 for newly operating software to the computation board 200 which may operate the corresponding pieces of application software. The instruction analysis module 270 of the computation board 200 transmits a scheduler change instruction for changing a state of all the pieces of application software into an operating state to the scheduler change module 260, and the scheduler change module 260 changes a scheduler identically in other cases. Then, the board reconfiguration procedure management module 170 identifies that every application software whose operation is stopped is re-operated through computation board state information to end a board reconfiguration procedure.

According to the example embodiments of the present invention, in the integrated modular avionics structure where a plurality of multi-core-based computation boards are equipped with a plurality of pieces of application software, reconfiguration may be performed for each level (a major fault/a minor fault in software or hardware) of a fault occurring in an avionics computer during operation.

The fault level of the avionics computer is divided into when a minor fault or a major fault occurs for a unit of application software and when a minor fault or a major fault occurs for a unit of hardware board. When a fault occurs for a unit of application software, reconfiguration for the unit of application software may be performed to restart application software or operate in another computation board without a loss of a computation board. When a fault occurs for a unit of hardware board, reconfiguration for a unit of computation board may be performed to move and operate every application software being operated in the corresponding computation board to and in a computation board with a spare or extra core.

As in above, according to the example embodiments of the present invention, the optimum number of computation boards according to a function of the avionics computer may be determined, thereby optimizing the use of available resources. Further, the number of spare computation boards for reconfiguration of the avionics computer may be minimized, thereby reducing the weight of an aircraft.

The apparatus and/or the system described above may be implemented through a hardware component, a software component, and/or a combination of the hardware component and the software component. The apparatus and components described in example embodiments may be implemented through, for example, a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers such as any other apparatuses that may execute and respond to instructions. A processing device may perform an operating system (OS) and one or more software applications performed on the OS. In addition, the processing device may access, store, manipulate, process, and generate data in response to the execution of software. For the convenience of understanding, the processing device may be described as one used, but those of ordinary skill in the art may understand that the processing device may include a plurality of processing elements and/or a plurality of types of processing elements. For example, the processing device may include a plurality of processors or one processor and one controller. Further, another processing configuration such as a parallel processor may be included.

Software may include a computer program, a code, an instruction, or a combination of one or more thereof and may configure a processing device to operate in a desired manner or independently or collectively provide instructions to the processing device. The software and/or data may be permanently or temporarily embodied in any type of machine, component, physical device, virtual equipment, computer storage medium or device, or transmitted signal wave to be interpreted by the processing device or provide instructions or data to the processing device. The software may be distributed among network-connected computer systems and may also be stored or executed in a distributed manner. The software and the data may be stored in one or more computer-readable recording media.

The method according to example embodiments may be implemented in the form of program instructions to be performable through various computer parts and recorded in a computer-readable medium. The computer-readable medium may include a program instruction, a data file, a data structure, or a combination thereof. The program instruction recorded in the medium may be designed and configured particularly for an example embodiment or may be known to those skilled in computer software and used. The computer-readable recording medium may include hardware devices configured to store and perform program instructions such as read-only memory (ROM), randomaccess memory (RAM), flash memory, magnetic media such as hard disk, floppy disk, and magnetic tape, and optical media such as CD-ROM and digital versatile disc (DVD), and magneto-optical media such as floptical disk. The program instructions may include not only machine language code provided by a compiler but also high-level language code executable by a computer using an interpreter. The hardware devices described above may be configured to operate as one or more software modules for performing an operation in an example embodiment or vice versa.

It will be apparent to those skilled in the art that various modifications and variations can be made in the systems, devices, methods, and instructions for resetting information about the execution of application software provided in a multi-core processor-based avionics computer device of the present invention without departing from the spirit or scope of the invention. Thus, it is intended that the present invention cover the modifications and variations of this invention provided they come within the scope of the appended claims and their equivalents.

What is claimed is:

1. An apparatus for resetting information about execution of application software provided in a multi-core processor-based avionics computer device, the apparatus comprising:

a computation board provided with application software that generates state information including information about a fault in the application software or hardware, and based on a multi-core processor in the multi-core processor-based avionics computer device in which the application software are distributed for each core and operated, the computation board being equipped with computation board management software configured to manage a state of the application software and dynamically change a scheduler of the application software or perform a restart according to instructions received from a system control board; and wherein the system control board that utilizes system control software to determine the fault in the application software or hardware of the computation board during ongoing operation based on the state information received from the computation board and to dynamically establish a fault response measure to reset information about execution of the application software based on information about the fault in application software or hardware of the computation board via a fault determination module, wherein the system control board is configured to:

determine a type and a level of the fault to be divided into when a minor fault or a major fault occurs for a unit of the application software and when a minor fault or a major fault occurs for a unit of computation board hardware based on the state information received from the computation board, and change the information about execution of application software or a computation board to execute the application software to change an operation form of the computation board depending on the minor fault or the major fault for the unit of the application software and the minor fault or the major fault for the unit of computation board hardware by transmitting instruction regarding a fault response measure determined by a fault response measure determination module corresponding to the determination the type and the level of the fault to one of a restart procedure management module, a software reconfiguration procedure management module and a board reconfiguration procedure management module, wherein the restart procedure management module restarts fault-occurring application software when the minor fault occurs for the unit of the application software.

2. The apparatus of claim 1, wherein the system control board operates application software in another computation board provided with application software identical to fault-occurring application software when the major fault occurs for the unit of the application software.

3. The apparatus of claim 1, wherein the system control board operates the application software in another computation board provided with every application software operated in a fault-occurring computation board when the major fault occurs for the unit of the computation board hardware.

4. A method of resetting information about execution of application software provided in a multi-core processor-based avionics computer device, the method comprising:

obtaining state information including information about a fault in application software or hardware from a computation board provided with application software and based on a multi-core processor in the multi-core processor-based avionics computer device in which the application software are distributed for each core and operated, the computation board being equipped with computation board management software configured to manage a state of the application software and dynamically change a scheduler of the application software or perform a restart according to instructions received from a system control board;

determining the fault in the application software or hardware of the computation board during ongoing operation utilizing system control software to dynamically establish a fault response measure based on the state information received from the computation board; and resetting information about execution of the application software based on information about the fault in application software or hardware of the computation board, wherein the determining of the fault includes determining a type and a level of a fault to be divided into when a minor fault or a major fault occurs for a unit of the application software and when a minor fault or a major fault occurs for a unit of computation board hardware via a fault determination module based on the state information received from the computation board, and wherein the determining of the fault includes changing the information about execution of the application software or the computation board to execute application software to change an operation form of the computation board depending on the minor fault or the major fault for the unit of the application software and the minor fault or the major fault for the unit of computation board hardware by transmitting instruction regarding a fault response measure determined by a fault response measure determination module corresponding to the determination the type and the level of the fault to one of a restart procedure management module, a software reconfiguration procedure management module and a board reconfiguration procedure management module, wherein the resetting of the information about the execution of the application software includes restarting, by restart procedure management module, fault-occurring application software when the minor fault occurs for the unit of the application software.

5. The method of claim 4, wherein the resetting of the information about the execution of the application software includes operating application software in another computation board provided with application software identical to fault-occurring application software when the major fault occurs for the unit of application software.

6. The method of claim 4, wherein the resetting of the information about the execution of application software includes operating the application software in another computation board provided with every application software operated in a fault-occurring computation board when the major fault occurs for the unit of the computation board hardware.

7. A computer program stored in a non-transitory recording medium for executing the method of any one of claim 4, 5, or 6 using a computing device.

8. An apparatus for managing software execution in an integrated modular avionics system during an aviation operation, the apparatus comprising:

at least one computation board comprising a multi-core processor where a plurality of application software are distributed among cores, the computation board configured to generate real-time state information regarding the software and the hardware; and a system control board configured to receive the state information and dynamically determine a fault response measure during the aviation operation, wherein the system control board classifies a detected fault into one of at least four categories: a minor software fault, a major software fault, a minor hardware fault, and a major hardware fault, wherein the system control board is configured to adaptively change the operation form of the computation board by:

restarting specific application software in response to a minor software fault;

reconfiguring specific application software to a different computation board in response to a major software fault; or displacing all software from a computation board to a different computation board in response to a major hardware fault.

* * * * *